United States Patent
Zou et al.

(10) Patent No.: US 8,133,612 B2
(45) Date of Patent: Mar. 13, 2012

(54) NEGATIVE ELECTRODES FOR RECHARGEABLE BATTERIES

(75) Inventors: Caisong Zou, Shanghai (CN); Chuanfu Wang, Shenzhen (CN); Junqing Dong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1031 days.

(21) Appl. No.: 10/771,010

(22) Filed: Feb. 2, 2004

(65) Prior Publication Data

US 2004/0229125 A1 Nov. 18, 2004

(30) Foreign Application Priority Data

| May 16, 2003 | (CN) | 2003 1 26631 |
|---|---|---|
| Jun. 20, 2003 | (CN) | 2003 1 26961 |
| Jul. 22, 2003 | (CN) | 2003 1 32939 |
| Aug. 16, 2003 | (CN) | 2003 1 40199 |

(51) Int. Cl.
*H01M 4/13* (2010.01)
*H01M 4/60* (2010.01)
*H01M 4/58* (2010.01)
*H01M 4/82* (2010.01)
*H01M 6/00* (2010.01)

(52) U.S. Cl. .......... 429/213; 429/212; 429/231.95; 29/623.5

(58) Field of Classification Search .......... 429/213, 429/231.4, 215, 212, 231.95; 29/623.5
See application file for complete search history.

(56) References Cited

U.S. PATENT DOCUMENTS 5,028,500 A * 7/1991 Fong et al. ............. 429/224
5,451,477 A * 9/1995 Omaru et al. ............. 429/326

OTHER PUBLICATIONS

IUPAC. Compendium of Chemical Terminology, 2nd ed. (the "Gold Book"). Compiled by A. D. McNaught and A. Wilkinson. Blackwell Scientific Publications, Oxford (1997). Available online at <<http://www.iupac.org/goldbook/N04193.pdf>>.*
Du, Cui-wei, et al., Surface Modification of Natural Graphite for Lithium Ion Batteries, Batteries Bi-monthly, Feb. 2002, p. 13, vol. 32, No. 1, China.

* cited by examiner

*Primary Examiner* — Patrick Ryan
*Assistant Examiner* — Julian Anthony
(74) *Attorney, Agent, or Firm* — Venture Pacific Law, PC

(57) ABSTRACT

This invention relates to a negative electrode of a rechargeable battery. In particular, the active material for the negative electrode is a mixture of two types of graphite, graphite A and graphite B. Graphite A are of graphite granules having an average granule diameter between 10 and 40 μm, and a crystallite interlayer spacing, $d_{002}$, between 0.335 and 0.342 nm. Graphite B are graphite granules with an average granule diameter between 5 and 30 μm and a crystallite interlayer spacing, $d_{002}$, between 0.336 and 0.360 nm. The ratio of the weight of the graphite A and graphite B is between 25:75 to 80:20. To fabricate said negative electrode, take said mixture of graphite A and graphite B, add binder, dispersant, and solvent. Then stir to mix, coating the resultant mixture on a foil, heat to dry, and compress to form the negative electrode. A lithium ion rechargeable battery made with said negative electrode has high discharge capacity, long cycle life, excellent high current and safety characteristics. The manufacturing process for this negative electrode is simple and cheap and therefore, it is easy to implement for mass production.

8 Claims, No Drawings

NEGATIVE ELECTRODES FOR RECHARGEABLE BATTERIES

CROSS REFERENCE

This application claims priority from the following Chinese patent application: "A Type of Improved Graphite and Its Method of Fabrication" filed on Aug. 16, 2003, having a Chinese Application No. 03140199.6; "The Fabrication Method of A Type of Improved Graphite" filed on May 16, 2003, having a Chinese Application No. 03126631.2; "Method for the Fabrication of a Carbon Containing Material for the Negative Electrode of A Type Lithium Ion Rechargeable Battery" filed on Jun. 20, 2003, having a Chinese Application No.03 1 26961.3; and "A Type of Lithium Ion Rechargeable Battery" filed on Jul. 22, 2003, having a Chinese Application No. 03 132939.X. All the above applications are incorporated herein by reference.

FIELD OF INVENTION

This invention relates to a type of rechargeable battery and its negative electrode. In particular, it relates to a mixture of ingredients that constitutes the active material for the negative electrode of a battery (e.g. lithium ion battery).

BACKGROUND

With the rapid development of the electronics, communications, and informational industries, market demands for power sources of electronics products have increased. Lithium ion rechargeable batteries with its many excellent properties are being broadly used to fill this demand. With their widespread use, consumers want higher battery performance, especially excellent overall battery properties. That is, the market is demanding that the lithium ion rechargeable battery have high discharge capacity, long cycle life, and excellent high current and safety characteristics.

For the lithium ion rechargeable battery, the active material for the negative electrode is critical in the battery's ability to increase the discharge capacity and cycle life. The stability of the underlying structure of the active material for the negative electrode is also important in assuring that the battery possesses excellent high current and safety characteristics.

At present, graphite materials are most commonly used as the active materials for the negative electrode of the lithium ion rechargeable battery. However, most graphite needs to be appropriately treated and modified before its can be widely used. Among the most common treatment methods, coating produces the best results. Many researchers have attempted to coat the surface of the graphite with a layer of polymer material and the carbonizing it at a predetermined temperature to obtain a "core-shell" structure for the graphite composite. This retains the reversible specific capacity and better charging and discharging platform characteristics of the graphite, but also incorporates the good compatibility of the polymer thermally decomposed carbon with the organic electrolyte solution. From that, they achieve the excellent qualities of long cycle life, good high current characteristics, safety and stability. However, in practical applications, the improvement in the overall properties is not ideal. For example, Batteries, 2002.32(1): 13-15, describes the use of epoxy resin and thermally hardened and decomposed carbon to modify crystalline flake natural graphite in multiple modification steps. This changed the form of the graphite and reduces the directional properties of the crystalline flake graphite. It also improves the surface morphology of the graphite, and improves the compatibility of the graphite and the electrolyte solution such that there is improvement in its cycle characteristics. However, the modified graphite obtained by this method has lower initial charging and discharging efficiency (approximately 80%) and cannot satisfy the market demand for this desired battery characteristic. In Japanese Patent JP10-012241, a CVD (Chemical Vapor Deposition) process is used to treat graphite for use as negative electrodes in batteries. However, its cycle characteristics are poor and the equipment for the treatment is complex and expensive, resulting in high production cost and difficulty in implementing this technology for industrial production.

Therefore, many researchers have started to research using multiple modification steps to modify different materials for the active material of the negative electrode. For example, CN1186350 involves combining carbon material A and material B, a metal with high lithium content or oxidized tin material, to form the active material for the negative electrode of the battery. A battery made with this material as its negative electrode has high reversible specific capacity. However, its cycle characteristics are still poor; its capacity retention rate is less than 90% after 20 charge and discharge cycles.

At present, several common problems are encountered when trying to improve the active material for the negative electrode of the lithium ion rechargeable battery. In attempting to improve the cycle stability characteristics, the initial charging and discharging efficiency is sacrificed. The ability to increase the cycle life span is limited, resulting in a battery that does not meet the demands of practical applications. Alternatively, the technology and equipment for the improvements are so complex that they result in a high cost of production and it is difficult to implement the improvements for commercial production. In summary, poor overall performance is the problem encountered by the existing technology for the lithium ion rechargeable battery.

SUMMARY OF INVENTION

An object of this invention is to provide a type negative electrode and a type of rechargeable battery that have excellent overall properties, such as high discharge capacity, long cycle life, and excellent high current and safety characteristics.

Briefly, this invention relates to a type negative electrode for the rechargeable battery. In particular, said negative electrode of said rechargeable battery, includes a graphite A comprising of a plurality of graphite granules having an average granule diameter between 10 and 40 µm, and a crystallite interlayer spacing, $d_{002}$, between 0.335 and 0.342 nm; and a graphite B comprising of a plurality of graphite granules with an average granule diameter between 5 and 30 µm and a crystallite interlayer spacing, $d_{002}$, between 0.336 and 0.360 nm. Said negative electrode is fabricated by a method comprising the steps of: (a) mixing said graphite A and graphite B; (b) adding binder, dispersant, and solvent to said mixture of said graphite A and graphite B; (c) stirring to mix at 300 rpm to 600 rpm for 0.2 hours to 10 hours; (d) coating, (e) drying with heat, and (f) compressing. A rechargeable battery (such as a lithium ion battery) made from said negative electrode has a high discharge capacity, long cycle life, and excellent high current and safety characteristics.

Some of the advantages of said rechargeable battery (such as a lithium ion battery) made from said negative electrode is that it has excellent overall qualities with high discharge capacity, long cycle life, excellent high current and safety characteristics. Another advantage is that the cost of production for this negative electrode is low; its fabrication technology is simple and easy to implement for commercial production.

DETAILED DESCRIPTION OF PREFERRED EMBODIMENTS

This invention relates to the negative electrode of a rechargeable battery. The active material of said negative electrode is a mixture of graphite A and graphite B. In embodiments of this invention, the weight ratio of graphite A to graphite B is between 25:75 to 80:20. Graphite A is a type of improved graphite with its granules having an average granule diameter of between 10 µm and 40 µm, and a crystallite interlayer spacing, $d_{002}$, between 0.335 nm and 0.342 nm. The graphite granules of Graphite B are a type of man-made, natural, or otherwise modified graphite granules with average granule diameter between 5 µm and 30 µm and crystallite interlayer spacing, $d_{002}$, between 0.336 nm and 0.360 nm. The granule diameter is the $D_{50}$ measured using a particle size analyzer. The crystallite interlayer spacing, $d_{002}$, is measured using an X-Ray diffractometer.

In the embodiments of this invention, the graphite B in the active material of said negative electrode has more than 30% of its granules with granule diameter smaller than the average granule diameter of the granules of graphite A. Also, the crystallite interlayer spacing, $d_{002}$, in the graphite granules of graphite A is smaller than the crystallite interlayer spacing, $d_{002}$, in the graphite granules of graphite B.

An embodiment of this invention has graphite A being a plurality of improved graphite granules with a "core-shell" structure. High temperature carbonization produces an amorphous carbon layer coating on the surface of an unimproved graphite granule. The unimproved graphite granule can be a natural, man-made or otherwise modified graphite granule whose electrochemical properties needed to be improved. This graphite A has graphite granules having a specific surface area between 0.96 $m^2/g$ and 5.73 $m^2/g$, measured by using the single-point BET method.

A preferred specification for this embodiment is for the specific surface area of the graphite granules of graphite A to be between 1.0 $m^2/g$ and 3.2 $m^2/g$, the average granule diameter to be between 12 µm and 30 µm, and the crystallite interlayer spacing, $d_{002}$, to be between 0.336 nm and 0.339 nm.

The negative electrode in this embodiment electrode is fabricated by adding binder, dispersant, and solvent to the mixture of graphite A and graphite B, stirring at 300 rpm to 6000 rpm for 0.2 hours to 10 hours to mix, coating to smear said graphite granules onto a foil, drying with heat, and compressing the foil to form the negative electrode.

In the embodiments of this invention, the average granule diameter of the graphite granules of graphite A is between 10 µm to 40 µm and the average granule diameter of the graphite granules of graphite B is between 5 µm and 30 µm. In practice, the granule diameter of some of the granules of graphite B is made smaller than the average granule diameter of the graphite granules of graphite A. By doing this, the distribution of the granule diameter of the graphite granules of graphite A and graphite B have complementary functions. The smaller granule diameter of the granules of graphite B, when mixed with the granules of graphite A, can fully fill the gaps between the granules of graphite A. To a certain degree, this phenomenon can improve the tapping density and compressing density of the graphite mixture and improve the alignment of the microscopic graphite granules such that the destruction of the graphite structure does not easily occur by the appearance of the peeling of the layers. This not only assures a higher reversible specific capacity for the battery, and also increases the battery's safety characteristics. In embodiments of this invention with practical applications, a preferred specification is to have over 30% of the granules in graphite B have granule diameters smaller than the average granule diameter of the graphite granules of graphite A.

In the embodiments of this invention, the crystallite interlayer spacing, $d_{002}$, for the graphite granules of graphite A is between 0.335 nm and 342 nm. The crystallite interlayer spacing, $d_{002}$, for the graphite granules of graphite B is between 0.336 nm and 0.360 nm such that the crystallite interlayer spacing, $d_{002}$, of the graphite granules of graphite A is smaller than the crystallite interlayer spacing, $d_{002}$, of the graphite granules of graphite B. That is, the degree of graphitization of the graphite granules of graphite A is higher while the degree of graphitzation of the graphite granules of graphite B is lower. The higher degree of graphitzation of the graphite granules of graphite A brings a high capacity battery. The lower degree of graphitization of the graphite granules of graphite B brings the associated long cycle life resulting in batteries with excellent overall characteristics. In embodiments with practical applications, the crystallite interlayer spacing, $d_{002}$, in the graphite granules of graphite A is smaller than in the graphite granules of graphite B.

In other embodiments of this invention, the thickness of the accumulation of the crystallite layers, Lc, and the size of the surfaces of the crystallite layers, La, of the graphite granules of graphite A are larger than that of the graphite granules of graphite B. This gives the microscopic foundation for the higher capacity of graphite A, since larger Lc and La results in more Li+ being easily absorbed and hidden, and better cycle stability of graphite B, since small Lc and La results in the crystallite structure being difficult to break. Due to the different but complementary properties of the microscopic structure of graphite A and graphite B, such as granule diameter distribution and the degree of graphitization, a negative electrode fabricated from this mixture takes the advantages and correct the shortcomings of both types of graphite. It fully utilizes the strengths of the two materials and effectively improves battery properties such as reversible capacity and cycle life. In the preferred embodiments with practical applications, the best results are obtained when the weight ratio of graphite A and graphite B in the mixture is between 25:75 and 80:20.

In an embodiment of this invention, a negative electrode of a lithium ion rechargeable battery is fabricated using a mixture of graphite A and graphite B, with the weight ratio of graphite A and graphite B is between 25:75 and 80:20. Binder, dispersant, and solvent are also added to said mixture of graphite A and graphite B, and then this mixture is stirred to mix at 300 rpm to 6000 rpm for between 0.2 hours to 10 hours, coated, heated to dry, and compressed to form the negative electrode Said binder can be one of the following: fluorine containing resin such as teflon (PTFE), polyvinylidene fluoride (PVDF), and polyethylene (PE) polyvinyl alcohol (PVA). The dispersant can be cellulose. Said solvent can be N-methyl pyrrolidone, dimethyl formamide, ethanol, or de-ionized water. The current collector for use in the negative electrode can be copper foil, stainless steel foil, or nickel foil. The form can be mesh-type and foil-type.

To fabricate a lithium ion rechargeable battery using an embodiment of said negative electrode, a positive electrode is made from the active ingredient for the positive electrode, the corresponding electrolyte, and binder coated on the current collector. The active material of the positive ingredient can be a type of compound where lithium can be embedded and can be reversely diffused in. For example, transition metal oxide materials containing lithium can be used. Chemicals obtained from the alloys of lithium and multiple types of transition metal can also be used. Particular examples are: $LiM^1_xM^2_{1-x}O_2$ and $LiM^1_yM^2_{2-y}O_2$. where $M^1$ and $M^2$ represents at least a type of transition metal element, including Co, Ni, Mn, Cr, V, Fe, Al, Zn, Ti, Sn, and In, with $0 \leq x, y \leq 1$. Other than those listed above, the oxides of vanadium, and sulfur containing compounds, such as $V_2O_5$ and TiS, can also be used. Lithium compounds with stable and excellent properties, such as $LiCoO_2$, $LiMnO_2$, $LiMn_2O_4$, or $LiNi_xCo_{1-x}O_2$ can be used. The electrolyte can be carbon materials such as carbon black or graphite. The binder can be teflon (PTFE), polyvinylidene fluoride (PVDF), polyethylene (PE) or polyvinyl alcohol (PVA). The current collector can be aluminum foil, stainless steel foil, or nickel foil. Its shape or form can be mesh type, box shape or foil-type.

For the fabrication of the lithium ion rechargeable battery, said electrolyte solution is an anhydrous electrolyte. For the electrolyte material, electrolyte salts that are customarily used in anhydrous electrolyte solution can be used. Examples are: lithium salts such as $LiPF_6$, $LiBF_4$, $LiAsF_6$, $LiClO_4$, $LiSbF_6$, LiCl, LiBr, or, $LiCF_2SO_3$. From the standpoint of the stability of oxidation, it is better to choose $LiClO_4$, $LiPF_6$, $LiBF_4$, and, $LiAsF_6$. The solvents are organic solvents and can be one or more of the following: ethylene carbonate, propylene carbonate, ethyl methyl carbonate, methyl propyl carbonate, dimethyl carbonate, diethyl carbonate, 1,1 or 1,2 dimethyl oxyl ethane, 1,2 diethyl oxyl ethane, tetrahydrofuran, dimethyl tetrahydrofuran, methyl phenoxide, ether, N-methyl pyrrolidone, dimethyl formamide, acetonitrile, propionitrile, cyanogen chloride, or ethyl acetate.

Said separator can be on woven fabrics or microporous membrane made with synthetic resin. It is preferable to use microporous membrane made with synthetic resin. The best results are obtained with microporous membranes made with polyolefine such as a microporous membrane of PE, PP (polypropylene) or PE/PP.

The lithium ion rechargeable battery made with above-described negative and positive electrodes, electrolyte solution and separator has high discharge capacity, long cycle life with excellent high current and safety characteristics. Also, the cost of production is low, the technology simple, and easy to industrialize.

The embodiments discussed below provide further details about this invention.

Embodiment 1

The following steps comprise the method for the fabrication of Embodiment 1.

Dissolve 5 g of thermoset phenol formaldehyde resin in anhydrous ethanol to form 50 ml of a 10% polymer solution.

Prepare 200 ml of a 5% polymer surface modifier by weighing and dissolving 10 g of coal pitch in tetrahydrofuran.

Use 100 g natural graphite granules and 50 ml of the polymer solution. Using a homemade sprayer head, spray the polymer solution uniformly on the graphite that is fluidized and rolling in high speed to coat the graphite granules. Heat to dry.

Immerse the coated graphite in the polymer surface modifier. Stir adequately, then filter to obtain coated graphite and heat dry. Sift with 300 mesh.

Put the sifted graphite into sealed tubular high temperature furnace. Pass highly pure nitrogen at 10 liter/min of flow volume and increase the temperature at 15°/min to 400° C. Hold the temperature for 1 hour. Then raise the temperature at 10° C./min to 1000° C. and hold the temperature for 3 hours before naturally lowering to room temperature to obtain the graphite granules of graphite A with a "shell-core" structure. The weight of the carbon layer coating is 5%. The average granule diameter represented by $D_{50}$ is 17.2 μm. The crystalline interlayer spacing, $d_{002}$, is between 0.336 nm and 0.337 nm, and the specific surface area is between 1.0 m2/g and 3.0 m2/g.

Mix the above described improved graphite granules of graphite A and manmade graphite granules of graphite B at the ratio 50:50 to make the active material for the negative electrode. The average granule diameter of the graphite granules of graphite B, $D_{50}$, is 16.8 μm, the crystallite interlayer spacing, $d_{002}$, is between 0.338 nm and 0.339 nm. Using PTFE as the binder (4% (w/w)), de-ionized water as the solvent, add a small quantity of dispersant and stir at a controlled speed of 300 rpm to 6000 rpm for 0.2 hours to 10 hours. Mix evenly, coat, heat dry, and compress to fabricate the negative electrode of the battery on copper foil.

The fabrication of the lithium ion rechargeable battery uses the above described negative electrode, $LiCoO_2$ as the active material of the positive electrode, LiPF6 as the electrolyte, a mixture of the following organic solvents: ethylene carbonate, ethyl methyl carbonate and diethyl carbonate as the solvent. The concentration is 1 mole/liter, the separator is a kind of composite separator made of PE and PP. In this embodiment, the weight of the active ingredient in the negative electrode is 1.80 g.

Embodiment 2

The weight ratio of graphite A and graphite B in this embodiment is 40:60. Other than this, all other processes and specifications remain the same as Embodiment 1.

Embodiment 3

The weight ratio of graphite A and graphite B in this embodiment is 33:67. Other than this, all other processes and specifications remain the same as Embodiment 1.

Embodiment 4

The weight ratio of graphite A and graphite B in this embodiment is 25:75. Other than this, all other processes and specifications remain the same as Embodiment 1.

Embodiment 5

The weight ratio of graphite A and graphite B in this embodiment is 60:40. Other than this, all other processes and specifications remain the same as Embodiment 1.

Embodiment 6

The weight ratio of graphite A and graphite B in this embodiment is 70:30. Other than this, all other processes and specifications remain the same as Embodiment 1.

Embodiment 7

The weight ratio of graphite A and graphite B in this embodiment is 80:20. Other than this, all other processes and specifications remain the same as Embodiment 1.

In order to test the properties of batteries made from Embodiments 1 though 7, the following comparison examples are also fabricated and the battery characteristics of the above-stated embodiments and comparison examples tested and compared.

COMPARISON EXAMPLE 1

The improved graphite granules of graphite A are used as the only active material for the negative electrode to make the battery. Other than this, all other processes and specifications remain the same as Embodiment 1.

COMPARISON EXAMPLE 2

Directly use man-made graphite granules as the graphite granules of graphite B as the only active material for the negative electrode to make the battery. Other than this, all other processes and specifications remain the same as Embodiment 1.

COMPARISON EXAMPLE 3

Directly use natural graphite granules without any coating treatment as graphite A and man-made graphite granules as graphite B. Use the 50:50 ratio to mix graphite A and graphite B. Other than this, all other processes remain the same as Embodiment 1.

The characteristics of the active material for the negative electrodes and the batteries for the Embodiment 1 though 7 and Comparison Examples 1 through 2 are tested or measured as follows:

The specific surface area of the active material for the negative electrode is obtained using single-point BET method.

The following characteristics of the batteries made from above said embodiments and comparison examples are:

Initial charging specific capacity is the charging capacity using 0.1 C of electricity to initially charge to 4.2V/weight of the active material for the negative electrode;

Initial discharging specific capacity is the discharging capacity using 0.1 C of electricity to discharge from 4.2V to 3.0V/weight of the active material for the negative electrode.

Initial charge/discharge efficiency=(Initial discharging specific capacity/Initial charging specific capacity)×100%.

One cycle means the charging to 4.2 volts with 1 C of electricity and followed by the discharge to 3.0 volts with 1 C of electricity. After repeated cycles, a particular cycle's capacity is the discharge capacity of that cycle.

For high current characteristics, $C_{3C}/C_{0.5C}$ is the ratio of discharging capacity using 3 C of current to discharge from 4.2V to 3.0V and from 0.5 C of current from 4.2V to 3.0 V.

For high current characteristics, $C_{2C}/C_{0.5C}$ is the ratio of discharging capacity using 2 C of current to discharge from 4.2V to 3.0V and from 0.5 C of current from 4.2v to 3.0 v.

Overcharging characteristics is tested in the following manner. At 4.8 volts constant voltage, charge the battery with 3A of high current and observe for 24 hours. If the battery does not explode, then this indicates that the charging characteristics are good and the battery passes this test. If not, then the characteristics are poor and the battery fails this test.

The testing results are shown in the following table:

| Embodiment/ Comparison Example | A:B | Specific surface area/ m²/g | Initial charging specific volume mAh/g | Initial Discharging Specific Capacity mAh/g | Initial charge/ Discharge efficiency % | 100 cycle capacity retention rate % | High Current Characteristics | | Over-charging characteristics |
|---|---|---|---|---|---|---|---|---|---|
| | | | | | | | $C_{3C}/C_{0.5C}$ | $C_{2C}/C_{0.5C}$ | |
| Embodiment1 | 50:50 | 1.76 | 384 | 357 | 93.0 | 94.6 | 82.2 | 94.5 | Pass |
| Embodiment2 | 40:60 | 2.03 | 385 | 350 | 90.9 | 93.9 | 78.9 | 92.2 | Pass |
| Embodiment3 | 33:67 | 2.94 | 383 | 338 | 88.3 | 95.0 | 76.7 | 91.0 | Pass |
| Embodiment4 | 25:75 | 3.85 | 381 | 334 | 88.0 | 95.7 | 76.3 | 91.9 | Pass |
| Embodiment5 | 60:40 | 1.89 | 386 | 356 | 92.2 | 93.8 | 83.3 | 94.8 | Pass |
| Embodiment6 | 70:30 | 1.50 | 390 | 359 | 92.1 | 93.5 | 83.6 | 95.1 | Pass |
| Embodiment7 | 80:20 | 1.26 | 387 | 361 | 93.3 | 93.1 | 85.7 | 95.7 | Pass |
| Comparison Example1 | 100:0 | 0.98 | 392 | 367 | 93.6 | 89.4 | 78.3 | 93.5 | Fail |
| Comparison Example2 | 0:100 | 4.13 | 375 | 318 | 84.8 | 95.6 | 69.5 | 90.1 | Pass |
| Comparison Example3 | 50:50 | 5.13 | 390 | 334 | 85.6 | 89.9 | 47.3 | 76.5 | Fail |

The above table shows that lithium ion rechargeable batteries where the active material for the negative electrode is made with a mixture of graphite A and graphite B have excellent overall properties. Their initial charge/discharge efficiency can reach 88% to 94%. They have longer cycle life; on the average, 93% to 95% of the capacity is retained after 100 cycles. They also have excellent high current characteristics; the ratio of discharge capacity with 3 C of electricity and discharge capacity with 0.5 C of electricity is between 75.3% and 86%. They also have stable and reliable safety characteristics.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating and not only the preferred embodiments described herein but all those other and further alterations and modifications as would be apparent to those of ordinary skilled in the art.

We claim:

1. A negative electrode of a rechargeable battery, comprising:
   a graphite A comprising of a plurality of graphite granules, said graphite granules having an average granule diameter between 10 and 40 μm, and a crystallite interlayer spacing for said granules, $d_{002}$, of between 0.335 nm and 0.342 nm; and
   a graphite B comprising of a plurality of graphite granules with an average granule diameter between 5 μm and 30 μm and a crystallite interlayer spacing, $d_{002}$, between 0.336 nm and 0.360 nm, wherein the weight ratio of said graphite A to said graphite B is between 25:75 and 80:20, wherein the graphite granules of said graphite B are disposed between gaps of the graphite granules of said graphite A, wherein the graphite granules of said graphite A have a core-shell structure having an unimproved graphite granule as the core and a carbon layer coating on the surface of said unimproved graphite granule as the shell, and wherein the specific surface area of the graphite granules of said graphite A is between 0.96 m$^2$/g. and 5.73 m$^2$/g.

2. The negative electrode of claim 1 wherein said graphite B has more than 30% of its graphite granules having their granule diameters smaller than the average granule diameter of the graphite granules of said graphite A.

3. The negative electrode of claim 1 wherein the crystallite interlayer spacing, $d_{002}$, of the graphite granules of said graphite A is smaller than the crystallite interlayer spacing, $d_{002}$, of the graphite granules of said graphite B.

4. The negative electrode of claim 3 wherein said graphite B has more than 30% of its graphite granules having their granule diameters smaller than the average granule diameter of the graphite granules of said graphite.

5. The negative electrode of claim 4 wherein said the graphite granules in said graphite A has a "core-shell" structure having an unimproved graphite granule as the core and a carbon layer coating on the surface of said unimproved graphite granule as the shell and where the specific surface area of the graphite granules of said graphite A is between 0.96 m$^2$/g. and 5.73 m$^2$/g.

6. A negative electrode of claim 1 wherein the weight of the carbon layer coating is 5% of said respective unimproved graphite granules.

7. A negative electrode of a rechargeable battery, comprising:
   a graphite A comprising of a plurality of graphite granules, said graphite granules having an average granule diameter between 10 and 40 μm, and a crystallite interlayer spacing for said granules, $d_{002}$, of between 0.335 nm and 0.342 nm; and the graphite granules in said graphite A has a "core-shell" structure having an unimproved graphite granule as the core and a carbon layer coating on the surface of said unimproved graphite granule as the shell and where the specific surface area of the graphite granules of said graphite A is between 0.96 m$^2$/g. and 5.73 m$^2$/g;
   a graphite B comprising of a plurality of graphite granules with an average granule diameter between 5 μm and 30 μm and a crystallite interlayer spacing, $d_{002}$, between 0.336 nm and 0.360 nm; and
   wherein the weight ratio of said graphite A to said graphite B is between 25:75 and 80:20; said graphite B has more than 30% of its graphite granules having their granule diameters smaller than the average granule diameter of the graphite granules of said graphite A; the crystallite interlayer spacing, $d_{002}$, of the graphite granules of said graphite A is smaller than the crystallite interlayer spacing, $d_{002}$, of the graphite granules of said graphite B; wherein the graphite granules of said graphite B are disposed between gaps of the graphite granules of said graphite A; wherein the graphite granules of said graphite A have a core-shell structure having an unimproved graphite granule as the core and a carbon layer coating on the surface of said unimproved graphite granule as the shell; and wherein the specific surface area of the graphite granules of said graphite A is between 0.96 m$^2$/g. and 5.73 m$^2$/g.

8. A negative electrode of claim 7 wherein the weight of the carbon layer coating is 5% of said respective unimproved graphite granules.

* * * * *